United States Patent [19]
LaLonde

[11] Patent Number: 5,755,459
[45] Date of Patent: May 26, 1998

[54] FOLDED AIR BAG WITH ADHESIVE

[75] Inventor: Gary R. LaLonde, Clinton Township, Mich.

[73] Assignee: TRW Vehicle Safety Systems Inc., Lyndhurst, Ohio

[21] Appl. No.: 665,682

[22] Filed: Jun. 18, 1996

[51] Int. Cl.[6] ................................................ B60R 21/16
[52] U.S. Cl. ................... 280/728.3; 280/732; 280/743.1
[58] Field of Search ........................... 280/743.1, 728.1, 280/732, 730.1, 728.2, 728.3, 743.2, 731

[56] References Cited

U.S. PATENT DOCUMENTS

| | | | |
|---|---|---|---|
| 3,778,085 | 12/1973 | Lipkin | 280/732 |
| 3,990,726 | 11/1976 | Oka et al. | 280/739 |
| 4,348,037 | 9/1982 | Law et al. | 280/728.3 |
| 4,842,300 | 6/1989 | Ziomek et al. | 280/732 |
| 4,963,412 | 10/1990 | Kokeguchi | 280/743.1 |
| 5,094,476 | 3/1992 | Chihaya | 280/743.1 |
| 5,114,180 | 5/1992 | Kami et al. | 280/743.1 |
| 5,193,847 | 3/1993 | Nakayama | 280/738 |
| 5,242,192 | 9/1993 | Prescaro et al. | 280/730.1 |
| 5,335,936 | 8/1994 | Faigle et al. | 280/728.2 |
| 5,398,968 | 3/1995 | Emambakhsh et al. | 280/743.1 |

FOREIGN PATENT DOCUMENTS

| | | | |
|---|---|---|---|
| 38 18 185 | 8/1989 | Germany | 280/743.1 |
| 3-279053 | 12/1991 | Japan | 280/743.1 |
| 4-166454 | 6/1992 | Japan | 280/743.1 |

*Primary Examiner*—Peter C. English
*Attorney, Agent, or Firm*—Tarolli, Sundheim, Covell, Tummino & Szabo

[57] ABSTRACT

A vehicle occupant safety apparatus (10) includes an inflatable air bag (14) folded and stored in a chamber (18) in a container (12). The air bag (14) has a plurality of folded portions (122, 126) when in the folded condition in the container (12). Adhesive material (130) releasably interconnects abutting folded portions (122a, 122b) to minimize shifting of the folded air bag (14). Preferably, other adhesive material (170) releasably interconnects flaps (100, 102) which cover the side (164) of the folded air bag (14) closest to the container door (68).

14 Claims, 3 Drawing Sheets

FOLDED AIR BAG WITH ADHESIVE

BACKGROUND OF THE INVENTION

1. Technical Field

The present invention relates to an inflatable vehicle occupant protection device, such as an air bag, for helping to protect a vehicle occupant.

2. Description of the Prior Art

A typical air bag assembly includes an air bag folded and stored in a container in the instrument panel or steering wheel of a vehicle. The container has a door covering an opening of the container. An inflator is actuated to direct inflation fluid into the folded air bag to inflate the air bag. As the air bag unfolds and inflates, it moves the container door out of the inflation path of the air bag, and the air bag inflates through the opening in a direction toward a vehicle occupant. The air bag, when inflated, can help to protect the vehicle occupant during a vehicle collision.

It is desirable to prevent the folded portions of the air bag from shifting relative to each other prior to inflation of the air bag. It is known to shrink wrap a folded air bag to minimize such shifting. It is also desirable to prevent the inflating air bag from rubbing against the container or the container door during inflation of the air bag. It is known to provide flaps covering the folded air bag for this purpose.

SUMMARY OF THE INVENTION

The present invention is a vehicle occupant safety apparatus comprising an inflatable vehicle occupant protection device for helping to protect an occupant of a vehicle. The protection device is inflatable from a deflated, folded condition to an inflated, unfolded condition by inflation fluid from an inflation fluid source. The protection device, when in the folded condition, comprises a plurality of folded portions of the protection device including first and second folded portions which are in abutting engagement. An adhesive material is located between and interconnects the first and second folded portions of the protection device when the protection device is in the folded condition. The adhesive material is releasable in response to the application of a force greater than a predetermined force between the first and second folded portions due to inflation of the protection device to enable relative movement between the first and second folded portions and movement of the protection device to the inflated condition.

The present invention is also a vehicle occupant safety apparatus comprising an inflatable vehicle occupant protection device which, when in the folded condition, comprises a stack of folded portions of the protection device. First and second sheet material flaps are connected with the protection device and cover a first side of the stack. The flaps are moved out of the inflation path of the protection device when the protection device inflates. An adhesive material is located between and interconnects the first and second flaps when the protection device is in the folded condition to resist separation of the flaps. The adhesive material is releasable in response to movement of the folded portions against the flaps to enable separation of the flaps and movement of the protection device to the inflated condition.

BRIEF DESCRIPTION OF THE DRAWINGS

The foregoing and other features of the present invention will become more apparent to those skilled in the art to which the invention pertains upon reading the following description of preferred embodiments of the invention in view of the accompanying drawings, wherein.

DESCRIPTION OF PREFERRED EMBODIMENTS

Figure 1:
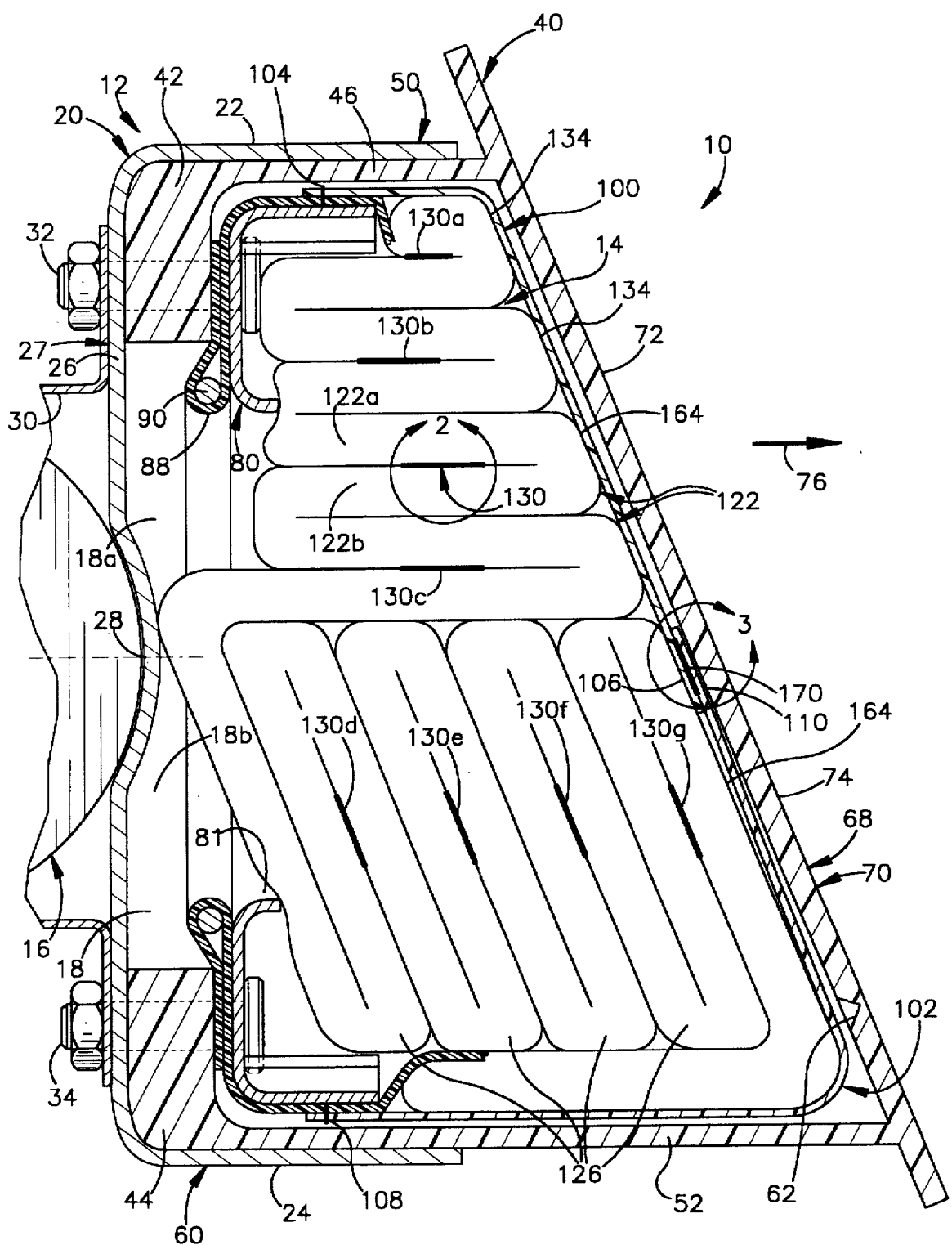
FIG. 1 is a schematic sectional view of a vehicle occupant safety apparatus including a folded air bag in accordance with the present invention.

The present invention relates to a vehicle occupant safety apparatus for helping to protect an occupant of a vehicle in the event of a collision. The present invention is applicable to various vehicle occupant safety apparatus constructions. As representative of the present invention, FIG. 1 illustrates a vehicle occupant safety apparatus or air bag module 10. Other inflatable vehicle occupant protection devices that can be used in accordance with the present invention include inflatable seat belts, inflatable knee bolsters, inflatable head liners, and knee bolsters operated by inflatable air bags.

The air bag module 10 includes a container 12 in which an inflatable vehicle occupant protection device 14 of the type commonly known as an air bag is folded and stored. The air bag 14 is preferably made from one or more panels of sheet material such as woven nylon. The air bag 14 could, alternatively, be made from another type of sheet material, such as plastic film. In FIG. 1, the thickness of the material of the air bag 14 is exaggerated for clarity. The air bag 14, when in the deflated, folded condition shown in FIG. 1, is disposed in a chamber 18 in the container.

The air bag module 10 also includes an inflator indicated schematically at 16 for inflating the air bag 14. The inflator 16 is disposed outside of the chamber 18. The inflator 16 may be an inflator which contains a stored quantity of pressurized inflation fluid and an ignitable material for heating the inflation fluid. The module 10 alternatively could include a pyrotechnic inflator which uses the combustion of gas-generating material to generate inflation fluid in the form of gas to inflate the air bag 14, or an inflator which contains only a stored quantity of pressurized inflation fluid for inflating the air bag.

The container 12 includes a metal housing 20. The housing 20 includes parallel upper and lower wall portions 22 and 24. An inner wall portion 26 of the housing 20 interconnects the upper wall portion 22 and the lower wall portion 24. The inner wall portion 26 of the housing 20 forms an inner wall 27 of the container 12. The inflator 16 is received in a recess 28 in the inner wall portion 26 of the housing 20. A bracket 30 and a plurality of container fasteners, two of which are shown at 32 and 34, secure the inflator 16 to the housing 20.

The container 12 also includes a plastic cover assembly 40. The container fasteners including the fasteners 32 and 34 extend through upper and lower rim portions 42 and 44 of the cover 40. The container fasteners secure the cover assembly 40 to the housing 20.

An upper wall portion 46 of the cover assembly 40 extends outward, that is, in a direction to the right as viewed in FIG. 1, from the upper rim portion 42. The cover assembly upper wall portion 46, together with the upper wall portion 22 of the housing 20, forms an upper wall 50 of the container 12.

A lower wall portion 52 of the cover assembly 40 extends outward, that is, in a direction to the right as viewed in FIG. 1, from the cover assembly lower rim portion 44. The cover assembly lower wall portion 52, together with the lower wall portion 24 of the housing 20, forms a lower wall 60 of the container 12. The cover assembly 40 includes a breakable portion or tear seam 62 at which the cover assembly 40 is designed to break open when the air bag 14 inflates.

The cover assembly 40 includes a container door 68 which forms an outer wall 70 of the container 12. In the illustrated embodiment, the outer wall 70 is disposed closest to the vehicle occupant when the air bag module 10 is mounted in the vehicle. The door 68 has an upper portion 72 which closes the upper end of the container 12. The door 68 has a lower portion 74 which is connected at its lower end with the breakable portion 62 of the cover assembly 40, to close the lower end of the container 12. The air bag 14 inflates generally in a first direction 76 through the outer wall 70 of the container 12, that is, to the right as viewed in FIG. 1.

The air bag module 10 includes a retaining ring 80 which is secured by fasteners, including the fasteners 32 and 34, to the container 12. The retaining ring 80 defines an inflation fluid opening 81 adjacent to the inflator 16. The retaining ring 80 secures the air bag 14 to the container 12. An end portion 88 (FIG. 1) of the air bag 14 wraps around an annular welt member 90 and is clamped (FIG. 1) between the retaining ring 80 and the cover assembly rim portions 42 and 44.

The air bag module 10 includes upper and lower flaps 100 and 102. The flaps 100 and 102 are made from a flexible sheet material, which can be the same material from which the air bag 14 is made. A typical material is 840 denier 32×32 nylon 6/6 woven fabric. The flaps 100 and 102 could, however, be made from a different woven fabric, or from a different type of sheet material.

The upper flap 100 is secured at one end portion to the air bag 14 by sewing as indicated schematically at 104. The upper flap 100 has an opposite end portion 106. The lower flap 102 is secured at one end portion to the air bag 14 by sewing as indicated schematically at 108. The lower flap 102 has an opposite end portion 110.

After the flaps 100 and 102 are attached to the air bag 14, the air bag is folded in a known manner to the condition shown in FIG. 1. The folded air bag 14, with the retaining ring 80, is placed inside the chamber 18 in the container 12 (FIG. 1) and secured in the container.

When the folded air bag 14 is in the container 12, the air bag includes a plurality of first folded portions 122 of the air bag. The first folded portions 122 of the air bag 14 lie generally horizontally in the container and are stacked from top-to-bottom in an upper portion 18a of the chamber 18. The first folded portions 122 extend between the container inner wall 27 and the container outer wall 70. The first folded portions 122 of the air bag 14 have a series of respective outer edge portions 134 which are disposed adjacent to the door upper portion 72.

When the folded air bag 14 is in the container 12, the air bag includes a plurality of second folded portions 126. The second folded portions 126 of the air bag 14 extend generally vertically in the container 12 and are stacked from outside to inside (right to left as viewed in FIG. 1) in a lower portion 18b of the chamber 18 of the container. The stack of second folded portions 126 is disposed below the stack of first folded portions 122 of the air bag 14. The second folded portions 126 are disposed between and extend between the first folded portions 122 and the bottom wall 60 of the container 12.

Prior to folding of the air bag 14, adhesive material is placed at selected locations on the sheet material of the air bag, in a manner described below. The adhesive material is, after folding of the air bag 14, disposed between abutting folded portions of the air bag to minimize shifting of the folded portions of the air bag.

Figure 2:
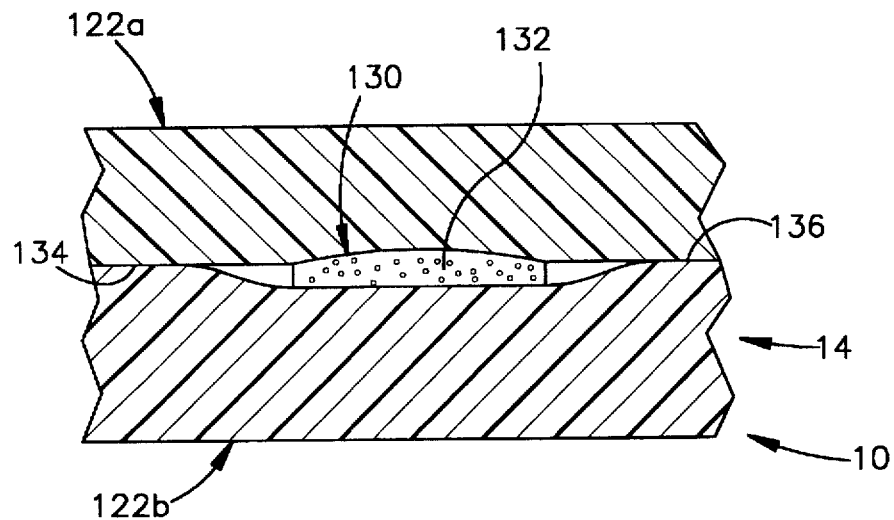
FIG. 2 is an enlarged sectional view of a portion of the air bag of FIG. 1 encircled by line 2 of FIG. 1.

One exemplary body of adhesive material 130 is illustrated schematically in FIGS. 1 and 2. The body of adhesive material 130 is in the form of a layer of adhesive 132 located between and interconnecting two adjoining folded portions 122a and 122b of the air bag 14. The folded portions 122a and 122b have respective inner side surfaces 134 and 136 which form part of the inner side surface of the air bag 14. The body of adhesive material 130 is formed by applying the layer of adhesive 132 either to the first folded portion 122a or to the second folded portion 122b, before the folded portions are moved into abutting engagement with each other.

Figure 4:
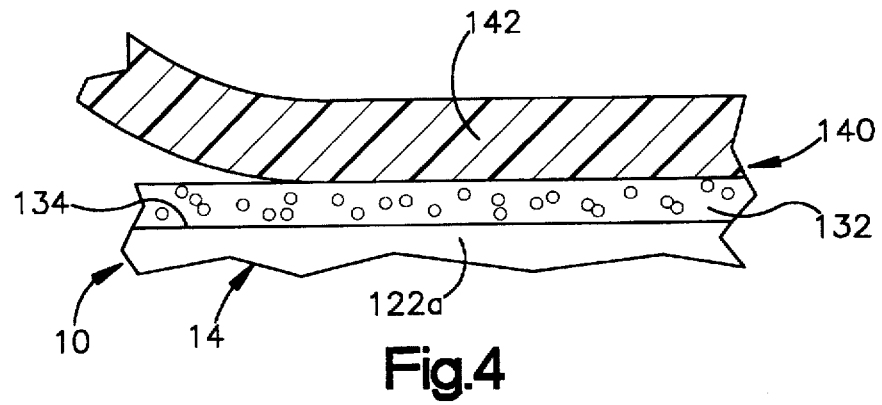
FIG. 4 is a schematic view showing the application of a single layer of adhesive to the air bag of FIG. 1.

The layer of adhesive 132 is preferably applied in the manner shown in FIG. 4. The layer of adhesive 132 forms a part of an acrylic pressure sensitive transfer film 140 (FIG. 4) which includes a liner layer 142 and the adhesive layer 132. One suitable brand of transfer film 140 is sold by Can-Do National Tape Company, Product No. C28601. The adhesive material in this transfer film is an acrylic pressure sensitive adhesive having a thickness of about 5 mils. The liner material is 76# bleached lay flat silicone treated kraft paper. The liner is about one-half inch wide. Other liner materials can be used. The transfer film is furnished rolled on a core. This product can be purchased from Tapeco, Inc., Nashville, Tenn. Another suitable brand of transfer film is sold by Avery Dennison Company, Product No. P-26 adhesive.

To apply the adhesive material 132 to the air bag 14, the transfer film 140 is placed on the inner side surface 134 of the folded portion 122a prior to movement of the folded portion 122a into abutting engagement with the folded portion 122b. The liner 142 is then peeled off as shown schematically at the left side of FIG. 4, leaving the layer of adhesive 132 behind on the folded portion 122a. When the air bag 14 is subsequently folded to the condition shown schematically in FIG. 1, the second folded portion 122b overlies and is in abutting engagement with the layer of adhesive 132 and the first folded portion 122a. The layer of adhesive 132 is located between and interconnects the first and second folded portions 122a and 122b.

The body of adhesive material 130 engages the inner side surface 134 of the first folded portion 122a and the inner side surface 136 of the second folded portion 122b. The body of adhesive material 130 resists relative movement between the first folded portion 122a of the air bag 14 and the second folded portion 122b of the air bag, unless a force greater than a predetermined force is applied between the first and second folded portions. The predetermined force is one which is not normally applied between the folded portions 122a and 122b until the air bag 14 is inflated with inflation fluid from the inflator 16.

Figure 5:
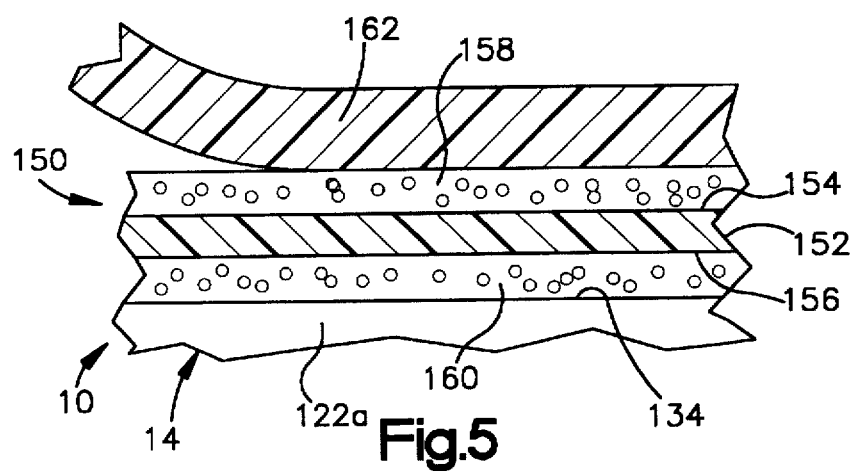
FIG. 5 is a schematic view showing the application of a double layer of adhesive to the air bag of FIG. 1.

The body of adhesive material 130 may, alternatively, be formed in the manner shown in FIG. 5. FIG. 5 illustrates schematically a portion of a piece of adhesive tape or transfer film 150 of the type commonly known as "double-sided" or "double-stick" tape. The transfer film 150 includes a carrier 152 having first and second opposite side surfaces 154 and 156. A first layer of adhesive 158 is disposed on the first side surface 154 of the carrier 152. A second layer of adhesive 160 is disposed on the second side surface 156 of the carrier 152. A liner 162 covers the first layer of adhesive 158. A suitable brand of transfer film 150 is available from the same sources identified above with respect to the transfer film 140.

The transfer film 150 is applied to the inner side surface of the air bag 14. The second layer of adhesive 160 is in abutting engagement with the inner side surface 134 of the first folded portion 122a. The liner 162 is peeled off as shown schematically in FIG. 5, leaving the second layer of adhesive 160 on the air bag 14. The second layer of adhesive 160 supports the carrier 152 and the first layer of adhesive 158. When the air bag 14 is, subsequently, folded to the condition shown in FIG. 1, the inner side surface of the second folded portion 122b of the air bag overlies and engages the first layer of adhesive 158. The adhesive layers 158 and 160, together with the carrier 152, form the body of adhesive material 130 which is located between and interconnects the first and second folded portions 122a and 122b.

As shown schematically in FIG. 1, similar bodies of adhesive material 130a–130g may be disposed at other locations in the air bag 14, that is, between other adjacent folded portions 122 or 126 of the air bag. The adhesive material can be selectively applied at desired locations to minimize shifting of the folded portions of the air bag 14 prior to and during assembly of the air bag in the container 12. The adhesive material can be formed as a single layer of adhesive only, in the manner of FIG. 4, or as a double-sided transfer film, in the manner of FIG. 5. It should be understood that the specific folded air bag 14 which is illustrated and described is merely exemplary of the different types of air bags and the different folding patterns to which the present invention is applicable.

Figure 3:
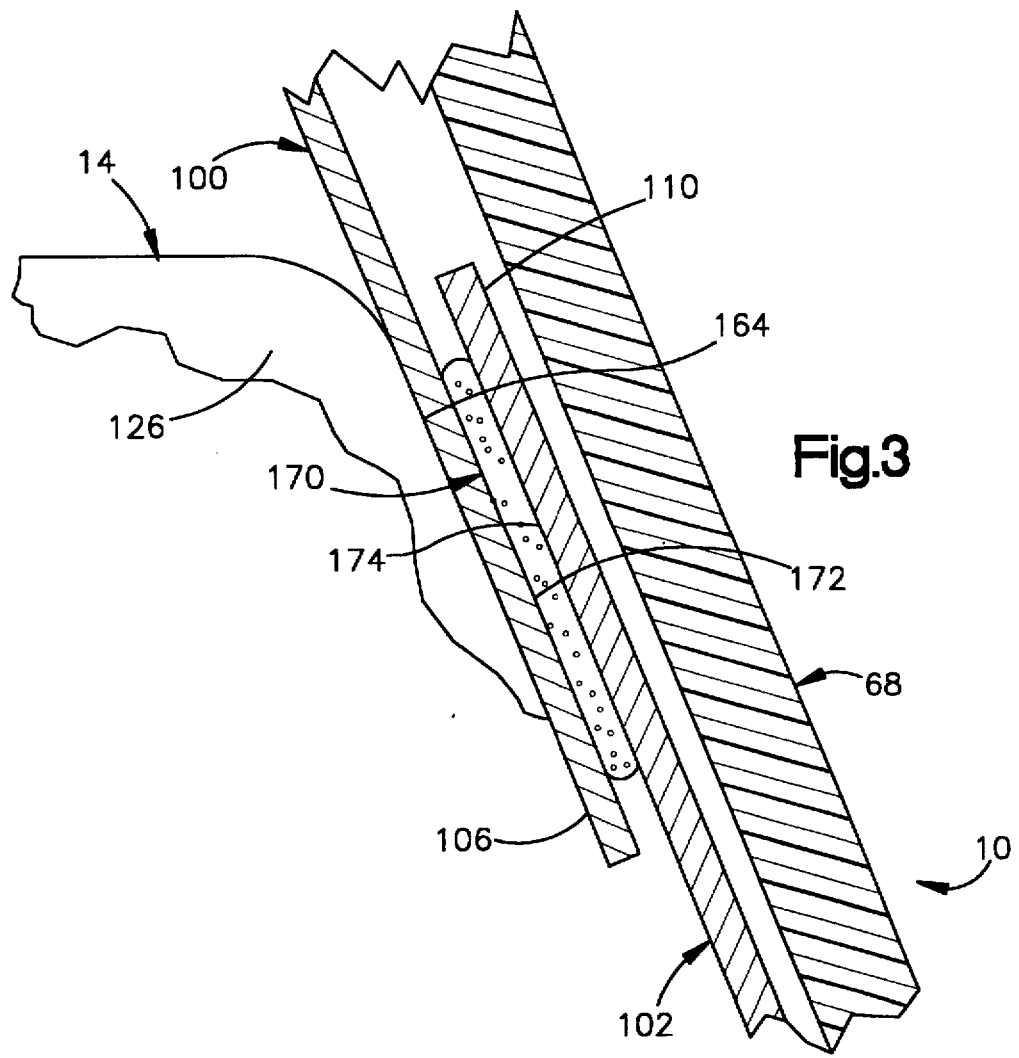
FIG. 3 is an enlarged sectional view of a portion of the vehicle occupant safety apparatus of FIG. 1 encircled by line 3 of FIG. 1.

When the folded air bag 14 is in the container 12, the stack of folded portions 122 and 126 of the air bag has a first side 164 (FIGS. 1 and 3) which is disposed immediately inward of the container door 68. The upper and lower flaps 100 and 102 are in the position shown in FIG. 1 covering the first side 164 of the stack. The flaps 100 and 102 are disposed between the stack of folded portions 122 and 126 and the container door 68, that is, in the inflation path of the air bag 14. The end portion 110 of the lower flap 102 overlies the end portion 106 of the upper flap 100.

A body of adhesive material 170 is located between and interconnects the end portions 106 and 110 of the flaps 100 and 102, respectively. The body of adhesive material 170 engages an outer side surface 172 of the upper flap 100 and an inner side surface 174 of the lower flap 102. The body of adhesive material 170 is formed in the same manner as the body of adhesive material 130 which releasably secures the folded portions 122a and 122b of the air bag 14. The body of adhesive material 170 can be applied as a single layer of adhesive only, in the manner of FIG. 4, or as a double-sided transfer film, in the manner of FIG. 5.

The body of adhesive material 170 resists separation of the upper flap 100 from the lower flap 102, unless a force greater than a predetermined force is applied between the upper and lower flaps. The predetermined force is one which is not normally applied between the flaps 100 and 102 until the air bag 14 is inflated with inflation fluid from the inflator 16.

In the event of an impact to the vehicle of a magnitude for which inflation of the air bag 14 is desired to help protect the vehicle occupant, the inflator 16 is actuated in a known manner and directs inflation fluid under pressure into the chamber 18 in the container 12. The walls of the container 12 direct the inflation fluid through the inflation fluid opening 81 in the retainer 80 and into the air bag 14. The air bag 14 unfolds and inflates. As the air bag 14 unfolds and inflates, it moves in the direction 76, that is, to the right as viewed in FIG. 1, toward the vehicle occupant.

During inflation of the air bag 14, the force of the inflation fluid flowing into the air bag overcomes the resistance to movement provided by the body of adhesive material 130 disposed between the first and second folded portions 122a and 122b of the air bag 14. The adhesive material 130 releases, and the folded portions 122a and 122b move relative to each other as the air bag 14 moves to the inflated condition. The other bodies of adhesive material which interconnect folded portions of the air bag 14, such as the bodies of adhesive material 130a–130g, also release upon inflation of the air bag. Because the adhesive material 130 is located on the inner side surface of the air bag 14, the adhesive does not enter the vehicle occupant compartment and is not engageable by the vehicle occupant.

When the stack of folded portions 122 and 126 of the air bag 14 moves against the inner side surfaces of the upper and lower flaps 100 and 102, the force of the moving stack overcomes the resistance to movement provided by the interconnected upper and lower flaps. Specifically, the body of adhesive material 170 which interconnects the upper and lower flaps 100 and 102 releases, and the flaps separate from each other. When the upper and lower flaps 100 and 102 separate, the air bag 14 can move to the inflated condition. The inflating air bag 14 contacts the container door 68. As the force of the inflating air bag increases, the cover assembly 40 breaks at the breakable portion 62. The door 68 pivots outwardly and upwardly from the position shown in FIG. 1 until the air bag 14 inflates completely.

The flaps 100 and 102, which are disposed between the inflating air bag 14 and the door 68, can minimize contact between the air bag and the door during inflation of the air bag. Also, the flaps 100 and 102 can prevent the inflating air bag 14 from rubbing against any fasteners or other protruding portions of the container which might be present in a safety apparatus including an air bag constructed in accordance with the present invention.

From the above description of the invention, those skilled in the art will perceive improvements, changes and modifications in the invention. Such improvements, changes and modifications within the skill of the art are intended to be covered by the appended claims.

Having described the invention, I claim:

1. A vehicle occupant safety apparatus comprising:
   an inflatable vehicle occupant protection device for helping to protect an occupant of a vehicle, said protection device being inflatable from a deflated, folded condition to an inflated, unfolded condition by inflation fluid from an inflation fluid source;
   said protection device when in the folded condition comprising a plurality of folded portions of said protection device including first and second folded portions which are in abutting engagement; and
   an adhesive material located between and interconnecting said first and second folded portions of said protection device when said protection device is in the folded condition;
   said adhesive material being releasable in response to the application of a force greater than a predetermined force between said first and second folded portions due to inflation of said protection device to enable relative movement between said first and second folded portions and movement of said protection device to the inflated condition.

2. An apparatus as set forth in claim 1 further comprising a container having a plurality of walls defining a chamber in said container, said protection device when in the deflated, folded condition being folded into a stack of folded portions in said chamber in said container, said stack of folded portions including said first and second folded portions.

3. An apparatus as set forth in claim 1 wherein said adhesive material comprises a plurality of bodies of adhesive material disposed at spaced apart locations between respective folded portions of said protection device.

4. An apparatus as set forth in claim 1 wherein said adhesive material comprises a carrier strip having first and second opposite side surfaces, a first layer of adhesive on said first side surface of said carrier strip, and a second layer of adhesive on said second side surface of said carrier strip;

said first layer of adhesive being located between and interconnecting said carrier strip and said first folded portion of said protection device;

said second layer of adhesive being located between and interconnecting said carrier strip and said second folded portion of said protection device.

5. An apparatus as set forth in claim 1 wherein said adhesive material comprises a layer of adhesive forming a portion of a transfer tape, said transfer tape further comprising a liner for applying said layer of adhesive to said protection device.

6. An apparatus as set forth in claim 1 wherein said adhesive material is a tacky acrylic pressure sensitive adhesive material.

7. An apparatus as set forth in claim 6 wherein said acrylic material has a thickness of about 5 mils.

8. An apparatus as set forth in claim 1 wherein said protection device comprises a panel of sheet material having an outer side surface for engagement by the vehicle occupant and having an opposite inner side surface, said adhesive material being disposed on said inner side surface of said panel.

9. An apparatus as set forth in claim 1 further comprising first and second flaps connected with said protection device and covering a first side of said folded portions of said protection device when said protection device is in the folded condition, said flaps being moved out of the inflation path of said protection device when said protection device inflates;

said apparatus further comprising an adhesive material located between and interconnecting said first and second flaps when said protection device is in the folded condition to resist separation of said flaps;

said folded portions of said protection device unfolding and moving against said flaps upon inflation of said protection device;

said adhesive material between said flaps being releasable in response to movement of said folded portions against said flaps to enable separation of said flaps and movement of said protection device to the inflated condition.

10. An apparatus as set forth in claim 9 further comprising a container having a plurality of walls defining a chamber in said container, said folded portions of said protection device being disposed in said chamber in said container, said container walls including a door of said container which is moved out of the inflation path of said protection device by said protection device when said protection device inflates, said first and second flaps being disposed intermediate said first side of said folded portions and said door of said container.

11. A vehicle occupant safety apparatus comprising:

an inflatable vehicle occupant protection device for helping to protect an occupant of a vehicle, said protection device being inflatable from a deflated, folded condition to an inflated, unfolded condition by inflation fluid from an inflation fluid source, said protection device when in the folded condition comprising a stack of folded portions of said protection device;

first and second sheet material flaps connected with said protection device and covering a first side of said stack when said protection device is in the folded condition, said flaps being moved out of the inflation path of said protection device when said protection device inflates;

a container having a plurality of walls defining a chamber in said container, said stack of folded portions of said protection device being disposed in said chamber in said container, said container walls including a door of said container which is moved out of the inflation path of said protection device by said protection device when said protection device inflates, said first and second flaps being disposed intermediate said first side of said stack and said door of said container; and an adhesive material located between and interconnecting said first and second flaps when said protection device is in the folded condition to resist separation of said flaps;

said folded portions of said protection device unfolding and moving against said flaps upon inflation of said protection device;

said adhesive material being releasable in response to movement of said folded portions against said flaps to enable separation of said flaps and movement of said protection device to the inflated condition.

12. An apparatus as set forth in claim 11 wherein said adhesive material is a tacky acrylic pressure sensitive adhesive material.

13. A vehicle occupant safety apparatus comprising:

an inflatable vehicle occupant protection device for helping to protect an occupant of a vehicle, said protection device being inflatable from a deflated, folded condition to an inflated, unfolded condition by inflation fluid from an inflation fluid source, said protection device when in the folded condition comprising a stack of folded portions of said protection device;

first and second sheet material flaps connected with said protection device and covering a first side of said stack when said protection device is in the folded condition, said flaps being moved out of the inflation path of said protection device when said protection device inflates;

at least one adhesive material located between and releasably interconnecting first and second ones of said folded portions of said protection device when in the folded condition; and another adhesive material located between and interconnecting said first and second flaps when said protection device is in the folded condition to resist separation of said flaps;

said folded portions of said protection device unfolding and moving against said flaps upon inflation of said protection device;

said another adhesive material being releasable in response to movement of said folded portions against said flaps to enable separation of said flaps and movement of said protection device to the inflated condition.

14. An apparatus as set forth in claim 13 wherein said another adhesive material is a tacky acrylic pressure sensitive adhesive material.

* * * * *